United States Patent
Blank et al.

(10) Patent No.: US 7,660,394 B1
(45) Date of Patent: *Feb. 9, 2010

(54) CLOSE-OUT TEST SYSTEM

(75) Inventors: Richard D. Blank, Overland Park, KS (US); Douglas B. Finch, Kansas City, MO (US); John Lloyd Morris, Gallatin, MO (US)

(73) Assignee: Embarq Holdings Company, LLC, Overland Park, KS (US)

( * ) Notice: Subject to any disclaimer, the term of this patent is extended or adjusted under 35 U.S.C. 154(b) by 736 days.

This patent is subject to a terminal disclaimer.

(21) Appl. No.: 11/238,055

(22) Filed: Sep. 29, 2005

Related U.S. Application Data

(63) Continuation of application No. 10/236,565, filed on Sep. 6, 2002, now Pat. No. 6,987,837.

(51) Int. Cl.
  H04M 1/24 (2006.01)
  H04M 3/08 (2006.01)
  H04M 3/22 (2006.01)
(52) U.S. Cl. .................. 379/1.01; 379/9.04; 379/14; 379/10.01; 379/21; 379/22.03; 379/27.01; 379/29.01
(58) Field of Classification Search ............... 379/1.01, 379/9, 9.03, 10.01, 15.01, 21, 22, 22.01, 379/22.03, 27.01, 29.01
See application file for complete search history.

(56) References Cited

U.S. PATENT DOCUMENTS

| | | | |
|---|---|---|---|
| 4,464,543 A * | 8/1984 | Kline et al. | 379/224 |
| 4,581,493 A | 4/1986 | Gazzo et al. | |
| 5,533,093 A * | 7/1996 | Horton et al. | 379/21 |
| 5,703,929 A | 12/1997 | Schillaci et al. | |
| 5,764,726 A * | 6/1998 | Selig et al. | 379/21 |
| 5,790,633 A | 8/1998 | Kinser, Jr. et al. | |
| 5,850,426 A | 12/1998 | Watkins et al. | |
| 6,026,145 A | 2/2000 | Bauer et al. | |
| 6,438,212 B1 * | 8/2002 | Lysaght et al. | 379/21 |
| 6,516,055 B1 * | 2/2003 | Bedeski et al. | 379/32.01 |
| 6,539,384 B1 | 3/2003 | Zellner et al. | |
| 6,614,880 B1 * | 9/2003 | Lysaght et al. | 379/21 |
| 7,149,285 B2 * | 12/2006 | Kennedy et al. | 379/27.01 |
| 2003/0202638 A1 * | 10/2003 | Eringis et al. | 379/15.01 |
| 2004/0081289 A1 * | 4/2004 | Lysaght et al. | 379/22.01 |
| 2005/0102580 A1 * | 5/2005 | House et al. | 714/38 |
| 2006/0050854 A1 * | 3/2006 | Beamon | 379/9.02 |

OTHER PUBLICATIONS

Morrall, Craig, "Closeout Testing: A Cable Centrick Workforce Management Solution," Copyright 2002 Acterna, LLC—15 pages.

* cited by examiner

*Primary Examiner*—Binh K Tieu
(74) *Attorney, Agent, or Firm*—Sonnenschein Nath & Rosenthal LLP

(57) ABSTRACT

The invention is a method and system conducting a completion test on a communications line. The system includes a testing device coupled to a remote device by a network. Line-test results are received from the testing device and made available to various client devices via the same or another network. Test data is automatically archived for analysis.

25 Claims, 16 Drawing Sheets

FIG. 4B

| Number: 6940913 | | | Phone Number: 4345894997 | | | | |
|---|---|---|---|---|---|---|---|
| Clear Date | Cat | Type | Worked On | Worked On Subname | Cause | Clrd By |
| 06/25/01 | 1 | 09 | 00 | | 60 | 14174 |
| 08/03/99 | 1 | 34 | 01 | | 27 | 14174 |
| 07/30/99 | 1 | 43 | 12 | | 10 | 54127 |
| 08/20/97 | 1 | 41 | | | 31 | 24122 |
| 10/19/95 | 4 | 61 | | | 61 | 67104 |

CLOSE-OUT TEST SYSTEM

CROSS-REFERENCE TO RELATED APPLICATIONS

This application is a Continuation of application Ser. No. 10/236,565, filed on Sep. 6, 2002, which is expressly incorporated by reference herein.

STATEMENT REGARDING FEDERALLY SPONSORED RESEARCH OR DEVELOPMENT

Not applicable.

TECHNICAL FIELD

This invention is related to the field of communications test systems. More particularly, the present invention provides a new and useful method for testing and diagnosing problems in telecommunications pathways.

BACKGROUND OF THE INVENTION

Telecommunications companies (telcos) offer services via communications lines. Common communications lines include Plain Old Telephone lines (POTs), Integrated Service Device Network (ISDN) lines, and Digital Subscriber Lines (DSL). One method for resolving technical issues is to dispatch a technician who will diagnose and attempt to resolve the problem. A prudent technician will conduct a close-out test to make sure that the reported problem is eliminated; and more importantly, to ensure that the line is free from nonreported errors.

Traditionally, a close-out test is carried out as an isolated event. That is, a technician—alone in the field—conducts the close-out test, observes the results, and subjectively makes a decision on the best course of action. Afterwards, the test results are lost. This method can present problems when the technician may be relatively inexperienced, unmotivated to actually perform the test, or when the technician does not know the best course of action to take. The technician bears the burden of tracking acceptable tolerances. Further, a supervisor must physically accompany a technician to observe test results and recommended action. Such a practice is inefficient and costly.

There is a need for a method and system of conducting a completion test whereby the results are stored; benchmark values are automatically provided and easily distributed; and supervisors (or other remote viewers) can observe the results in near real-time from an off-site location.

SUMMARY OF THE INVENTION

The present invention solves at least the above problems by providing a system and method for conducting completion tests that captures test results, automatically retrieves benchmark values, and allows near real-time remote-viewing of the test results. The invention has several practical applications in the technical arts including, but not limited to: increasing the reliability of a communications network, reducing the number of technician call-backs, and improving the quality of service offered to customers.

In a first aspect of the invention, a method is disclosed for providing line-test results. Line-test results are received from a client device. The client device can be a handheld terminal, a laptop computer, etc. The test results are stored. Finally, remote access to the test results is provided. Remote access can be accomplished in a variety of ways. The results can be placed on a Web server for subsequent download or made directly available via the Internet from their storage location.

In another aspect of the invention, a method for obtaining line-test results in a communications network environment is provided. Line-test results are automatically compared to respective benchmark values. These benchmarks can be updated and then downloaded to the testing device; thereby removing the burden from the technician of tracking tolerances and acceptable ranges of test results. An indication that one or more of the line-test results are beyond a benchmark is presented to the technician. The results are captured and uploaded to a remote device. Uploading the results to the remote device allows the results to be accessed via a network such as the Internet.

In a final aspect of the invention, a user interface for facilitating a communications line test is provided. Although various screens of richer content are included, two main screen presentations capture trouble and related data: a trouble-report area for conveying demographic data related to a communications-line user and a report-resolution-screen area for communicating problem-resolution information related to problem-resolution steps.

BRIEF DESCRIPTION OF THE SEVERAL VIEWS OF THE DRAWINGS

The present invention is described in detail below with reference to the attached drawing figures, wherein:

FIGS. 4A-4I are exemplary screen shots illustrating the various information communicated by the client application;

FIG. 4J is a screen shot of an exemplary test results screen;

FIG. 4K is a block-diagram representation of the screen shot of 4J; and

DETAILED DESCRIPTION OF THE INVENTION

Figure 1A:
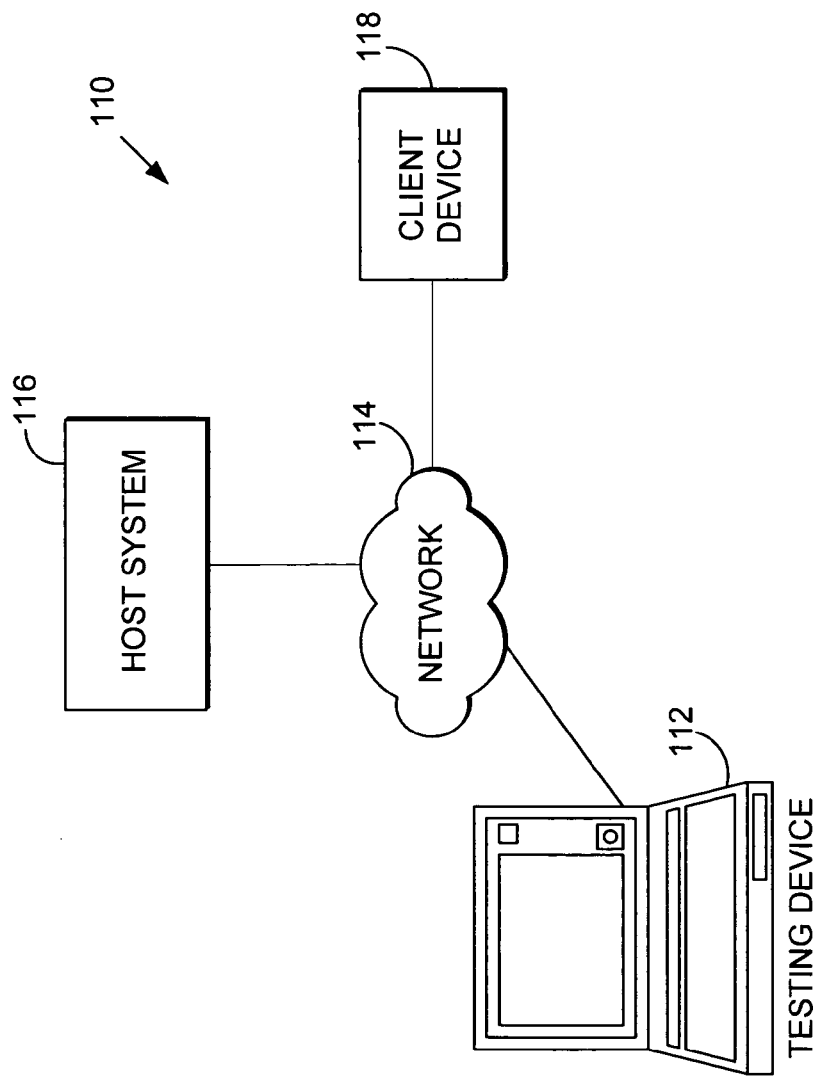
FIG. 1A is an overview block diagram of the invention components.

The present invention is directed to a system and method for testing communications lines. Exemplary communications lines include telephone circuits and ISDN lines. Various problems can plague a communications line and degrade the quality of service delivered to an end-user. The present invention has several practical applications in the technical arts that include providing an improved method and system for conducting communications tests by capturing the results gathered from the tests and making those results remotely accessible. Near real-time access to the test results offers the ability to improve performance of communications lines by evaluating the quality of the tests run and reducing the frequency of follow-up visits.

Various technical terms are used throughout this disclosure. An aid to defining such terms is *Newton's Telecom Dictionary*, 18$^{th}$ Updated and Expanded Edition (2002) by Harry Newton. These definitions are intended to provide a clearer understanding of the ideas disclosed herein but are in no way intended to limit the scope of the present invention.

The definitions and terms should be interpreted broadly and liberally to the extent allowed by the art and the meaning of the words offered in the above-cited reference.

The present invention will be described more fully with reference to the accompanying figures, in which various exemplary embodiments of the invention are shown. The present invention should not be construed as limited to those embodiments. Rather, the described embodiments are illustrative in nature.

As one skilled in the art will appreciate, the present invention may be embodied as, among other things: a method, a data-communications system, or computer-program product. Accordingly, the present invention may take the form of a hardware embodiment, a software embodiment, or an embodiment combining software and hardware. The present invention may take the form of a computer-program product that includes computer-useable instructions embodied on a computer-readable medium.

Computer-readable media include both volatile and nonvolatile media, removable and nonremovable media. By way of example, and not limitation, computer-readable media may comprise computer-storage media and communications media.

Computer-storage media include media implemented in any method or technology for storing information. Examples of stored information include computer-useable instructions, data structures, program modules, and other data representations. Computer-storage media include, but are not limited to: RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices.

Communications media typically embody computer-useable instructions—including data structures and program modules—in a modulated data signal. The term "modulated data signal" refers to a propagated signal that has one or more of its characteristics set or changed to encode information in the signal. An exemplary modulated data signal includes a carrier wave. Communications media include any information-delivery media. By way of example but not limitation, communications media include: wired media, such as a wired network or direct-wired connection, and wireless media such as acoustic, infrared, radio, microwave, spread-spectrum, and other wireless media technologies. Combinations of the above are included within the scope of computer-readable media.

Close-Out Test System

Turning now to FIG. 1A, an embodiment of a close-out test system (test system) is referenced generally by the numeral 110. Test system 110 includes a testing device 112, coupled via network 114 to a host system 116, and optionally to a client device 118.

In a preferred embodiment testing device 112 is a handheld terminal. Testing device 112 could be an alternative computer, a consumer electronic device, a handheld device, a handheld terminal, a personal data assistant, or any other device equipped with a client application that facilitates testing a communications line. Components of testing device 110 may include, but are not limited to: input/output devices, a display, a processing unit, internal system memory, as well as a suitable system bus for coupling together the various internal system components and for connecting these components to external devices. These individual components and subcomponents are not shown because of their conventional nature. Testing device 112 typically includes, or has access to, a variety of computer-readable media, which includes any media accessible by testing device 112. A suitable combination of hardware for practicing the present invention includes the 6250 Pro Field Laptop Computer, made by the Itronix Corporation of Spokane, Wash., equipped with a T-BERD 109 XC expansion card (TB-109), made by Acterna Corporation, of Germantown, Md.

As will be explained in greater detail below, testing device 112 is used to conduct a variety of tests on a communications line. Conducting these tests produces test results. These test results can be stored locally or remotely, by uploading them to a host system. Uploading the results to host system 116 via network 114 enables the results to be viewed on client device 118.

Figure 1B:
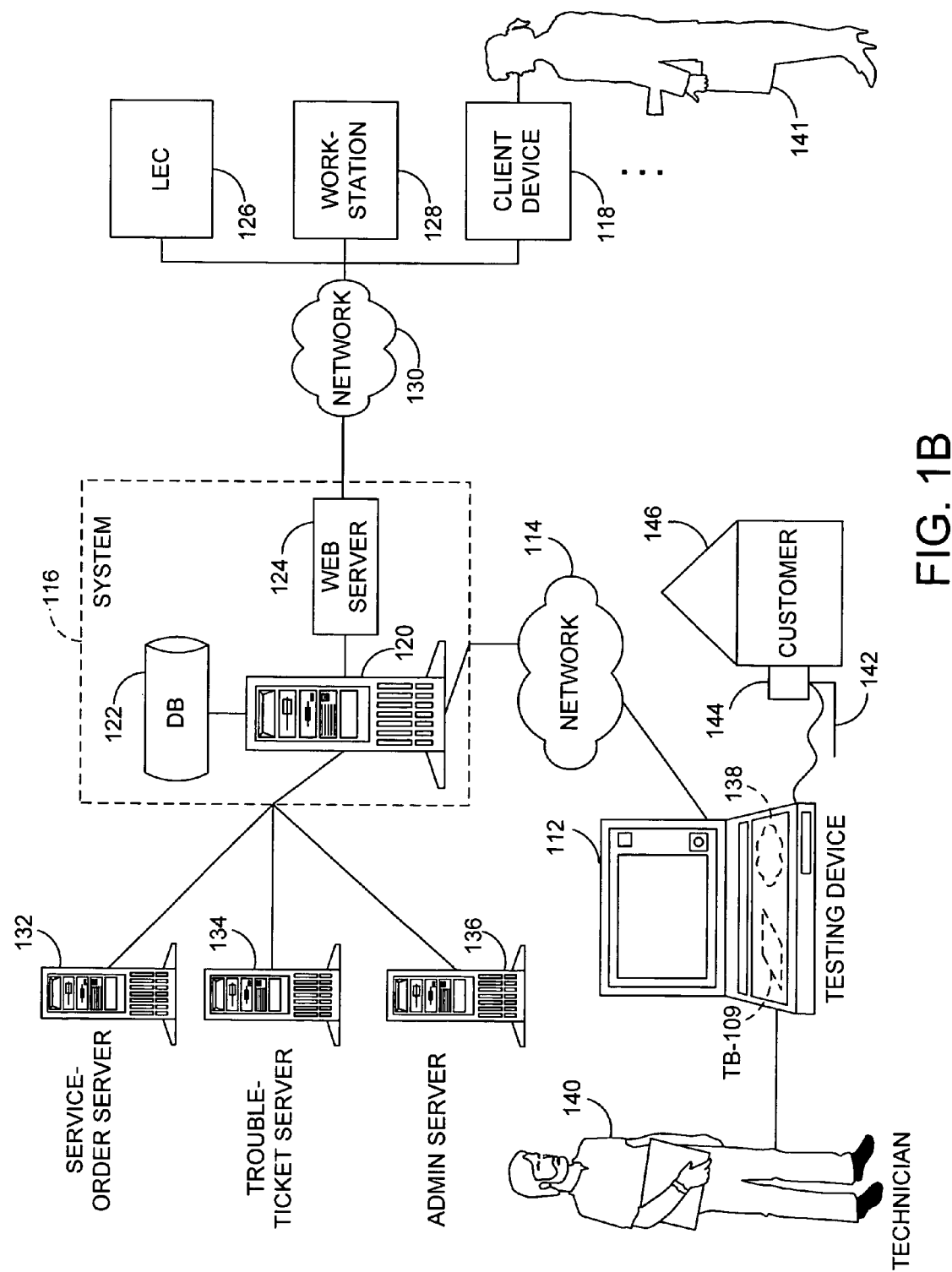
FIG. 1B is a more detailed diagram of an exemplary operating environment for practicing the present invention.

Turning now to FIG. 1B, a more detailed diagram of testing system 110 is provided. Illustrated in FIG. 1B is merely one embodiment of the present invention and is not intended to limit its scope. Some of the components are optional components, and those of ordinary skill in the art will appreciate substitutes and alternatives to the exemplary components shown. In one embodiment, host system 116 includes a test server 120, which is logically coupled to a database 122 and a Web server 124. Database 122 and Web server 124 can be subcomponents within test server 120.

Figure 1C:
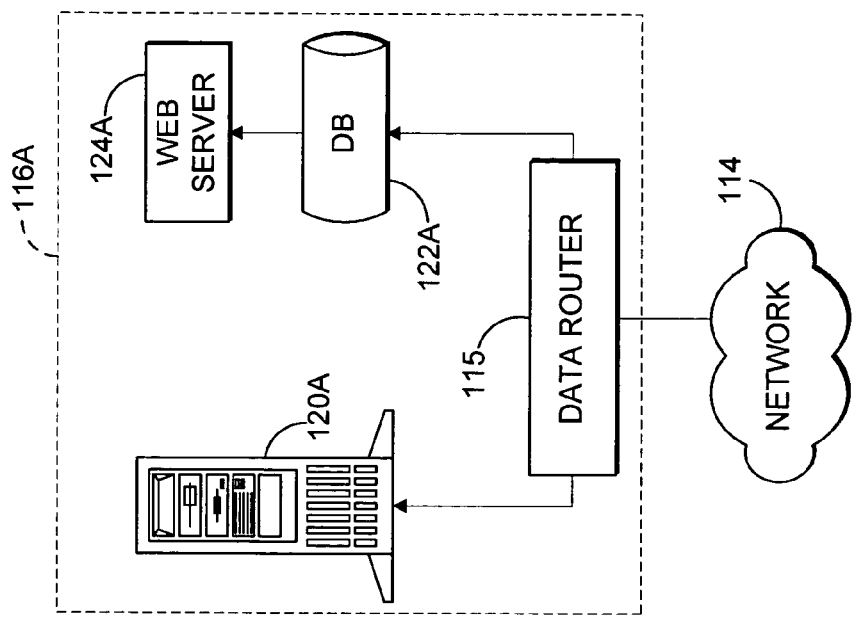
FIG. 1C depicts a preferred embodiment of the host system of FIG. 1B and includes a data route.

Turning briefly to FIG. 1C, a preferred embodiment of host system 116A is provided. Data router 115, which can be embodied completely in software, intercedes between a server 120A and a database 122A, which is coupled to a Web server 124A. As will be explained below, data router 115 directs closed-out test data to database 122A. Data related to uncompleted tests are routed to server 120A.

Returning to FIG. 1B, various client devices, including a local exchange carrier 126, a workstation 128, and alternative client device 118 can be logically coupled to host system 116 via a second network 130. But the second network 130 could also be network 114. Other servers such as a service-order server 132, a trouble-ticket server 134, and an administration server 136 can be logically coupled to test server 120. Testing device 112 is equipped with a client application 138 that a technician 140 uses to conduct the various tests on a communications line 142. In a preferred embodiment, tests are conducted at a termination point, such as a customer's network interface device (NID) 144. The present invention could be used, however, at various points along communications line 142.

As previously mentioned, client application 138 is used to conduct a variety of line tests. Exemplary line tests that can be carried out by client application 138 include: a voltage test, a current test, a resistance test, an impedance test, a reactance test, a line test, a tone test, a balance test, a frequency test, a loss test, a signal-degradation test, a power-influence test, a noise test, a fault test, a dead-air test, a continuity test, a signal-quality test, a completion test, a loop-link test, a joint-resistance test, an irregular-load test, a capacitance test, a wet-cable test, and a split-pair test. The different tests listed are exemplary in nature. Those skilled in the art will appreciate other tests that could also be carried out by client application 138.

The present invention provides a way for the technician's 140 supervisor, or other remote viewer 141, to observe what tests were performed and the corresponding results obtained. The present invention enables a remote viewer 141, without being physically present with technician 140, to recommend action based on the test results obtained. This increases the probability that the tests are properly conducted and that problems are being properly resolved.

Figure 2:
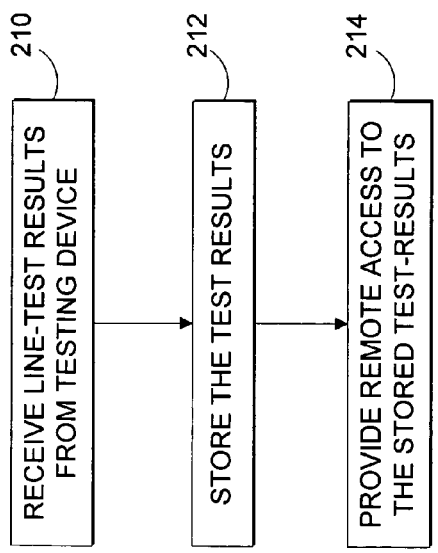
FIG. 2 is a high-level flow diagram illustrating one embodiment of a method for testing a communications line.

Turning now to FIG. 2, a high-level overview of one embodiment of a method for testing communications line 142 is provided. At a step 210, line-test results are received from testing device 112. These results are stored at a step 212. The results can be stored either locally or on a remote device, such as host system 116. Finally, at a step 214, remote access to the stored test results is provided.

Figure 3:
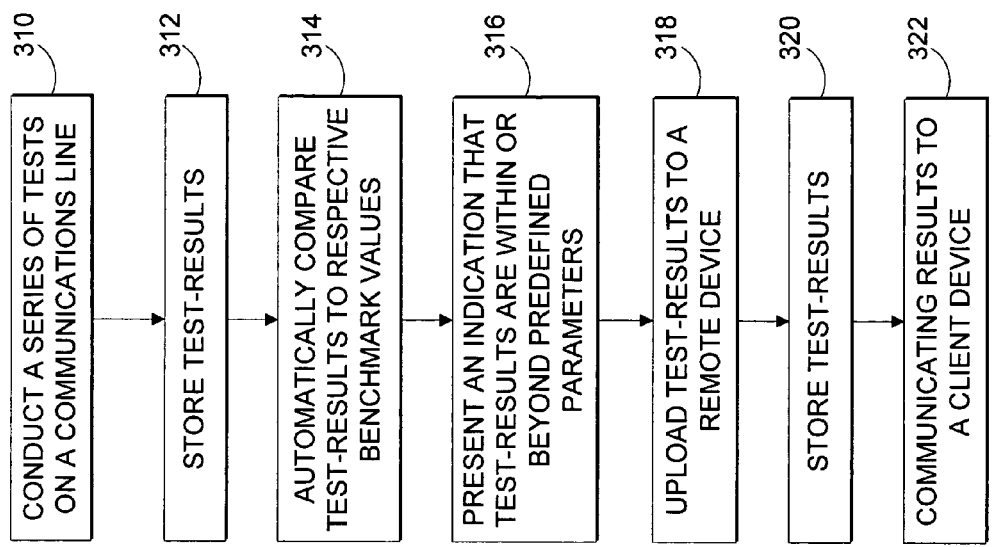
FIG. 3 is a more detailed flow diagram for practicing the present invention.

Turning now to FIG. 3, a more detailed process for practicing an embodiment of the present invention is provided in greater detail. At a step 310, a series of tests on communications line 142 are conducted. In a preferred embodiment, the tests are carried out by a test-set integrated with the testing device 112.

After conducting some or all of the previously mentioned tests, corresponding test results are generated. These test results can optionally be stored locally at a step 312. One method of storing the results is to embody the results on a computer-readable medium. At a step 314, the present invention automatically compares the test results to respective benchmark values. An indication that one or more of the line-test results are within predefined parameters is presented at a step 316.

In a preferred embodiment, the predefined parameters are communicated to testing device 112 via network 114. Thus, benchmark values are updated easily and quickly. An acceptable range of result values indicates whether one or more values are within a predefined parameter. For example, a range of less than 20 milliamps can be presented on testing device 112 in reference to a current-loop test. If a current-loop test yields results that are beyond 20 milliamps, the test fails.

At a step 318, the results are uploaded to a remote device. The remote device can be host system 116. A nonexhaustive list of alternative remote devices includes: a server, a computer, a consumer-electronic device, a handheld device, a handheld terminal, a telephony device and a personal data assistant. Those skilled in the art will appreciate other electronic devices that could receive the uploaded test results.

As previously mentioned, in a preferred embodiment with reference to FIG. 1C, data router 115 directs closed-out test data to database 122A and uncompleted tests to server 120A. Thus, if a test is actually closed out, Web server 124A makes the data available for download. The data related to incomplete tests is directed to server 120A where it can be redistributed or reassigned to another technician.

The test results are stored at a step 320. Again, the test results can be stored in a variety of locations. The stored test results can be communicated to a client device at a step 322. In one embodiment, Web server 124 communicates with various network devices via network 130, which can be network 114, a single line, a wireless network, a local-area network, a wide-area network, a distributed network, a communications network, the World Wide Web, the Internet, or a combination of the same. With the test results uploaded, a remote viewer 141 can access the test results of communications line 142. For example, an individual at a local exchange carrier 126 can download the test results. Similarly, a person working at a workstation 128 could view the test results. Virtually any other client device 118 that has access to the Internet or network 130 would be able to access the test results. Although not necessary, secure connections can be established through network 130 and/or network 114.

Web server 124 can parse the data and present it in a more user-friendly format. For instance, reports can be generated that depict only the test results. Alternatively, reports can combine the test results with data related to technician 140. This allows a supervisor to rate and assess the quality of tests conducted by technician 140. For example, a technician's name and the location of where [s]he took the test could be combined with the test results and downloaded through Web server 124 via network 130 to a client device 118. Those skilled in the art will appreciate the fact that reports can also be created dynamically. Using technology such as Java programming or ActiveX controls, raw data can be downloaded through network 130 and then dynamically created at client device 118 for viewing by a user 141.

In another aspect of the invention, a user interface is provided for testing communications line 142. The user interface for the present invention includes at least two screen-presentation sets: the first is a trouble-report-screen presentation and the second is a report-resolution-screen presentation. These two screen presentations are characterized by the data communicated to an observer. For example, the trouble-report-screen presentation communicates demographic data related to a communications-line user such as customer 146. The report-resolution-screen presentation communicates problem-resolution information related to the different problem-resolution steps taken by technician 140.

Figure 4A:
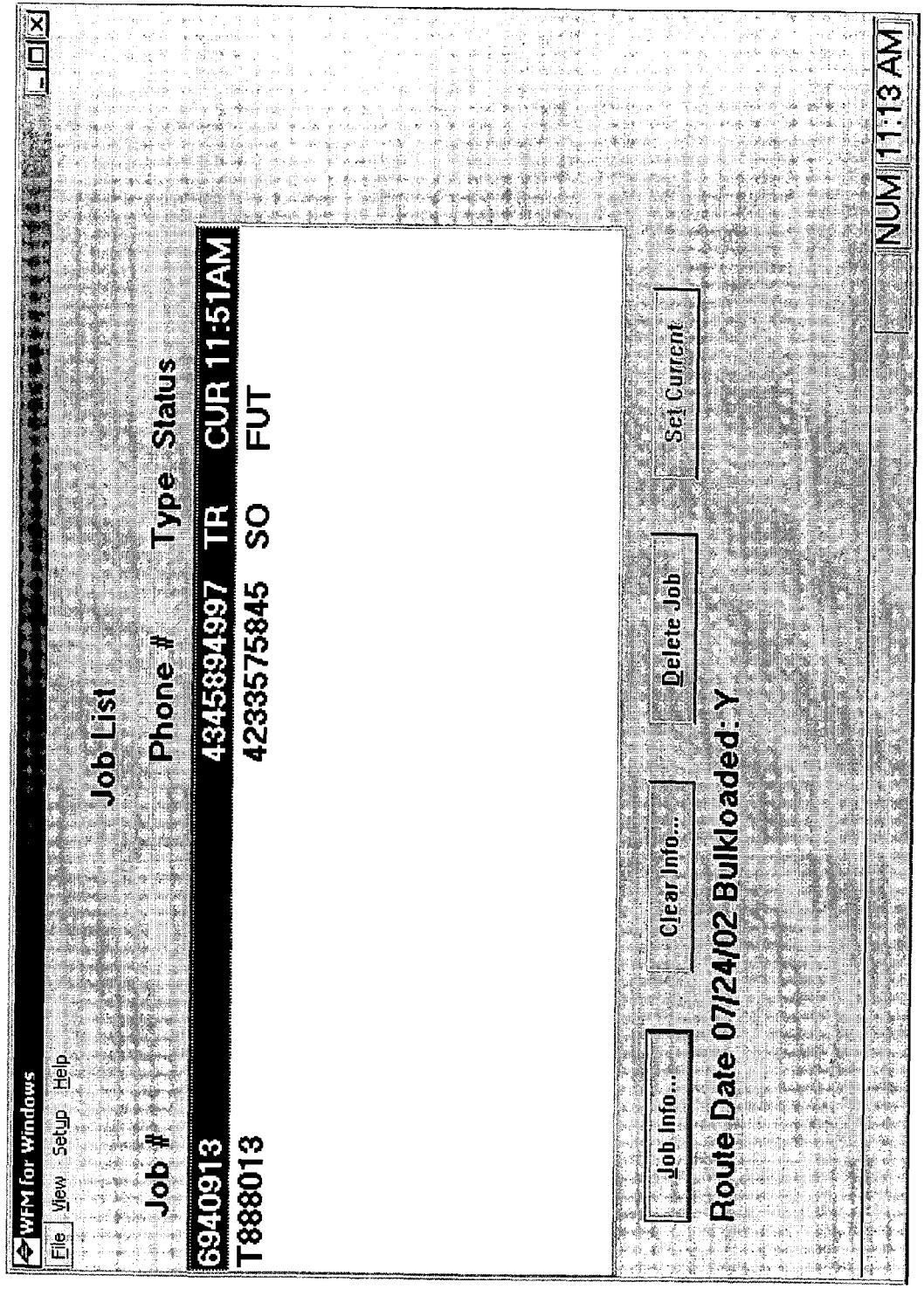

Exemplary trouble-report screens are provided in FIGS. 4A through 4I. FIG. 4A is a screen shot illustrating that the present invention allows a technician 140 to receive jobs remotely. For example, with further reference to FIG. 4A, trouble-ticket server 134 presents a job, having job number "6940913" to testing device 112 through test server 120 and network 114. The job number is listed and associated with a phone number, type, and status. Demographic data can also be associated with the trouble ticket.

Figure 4B:
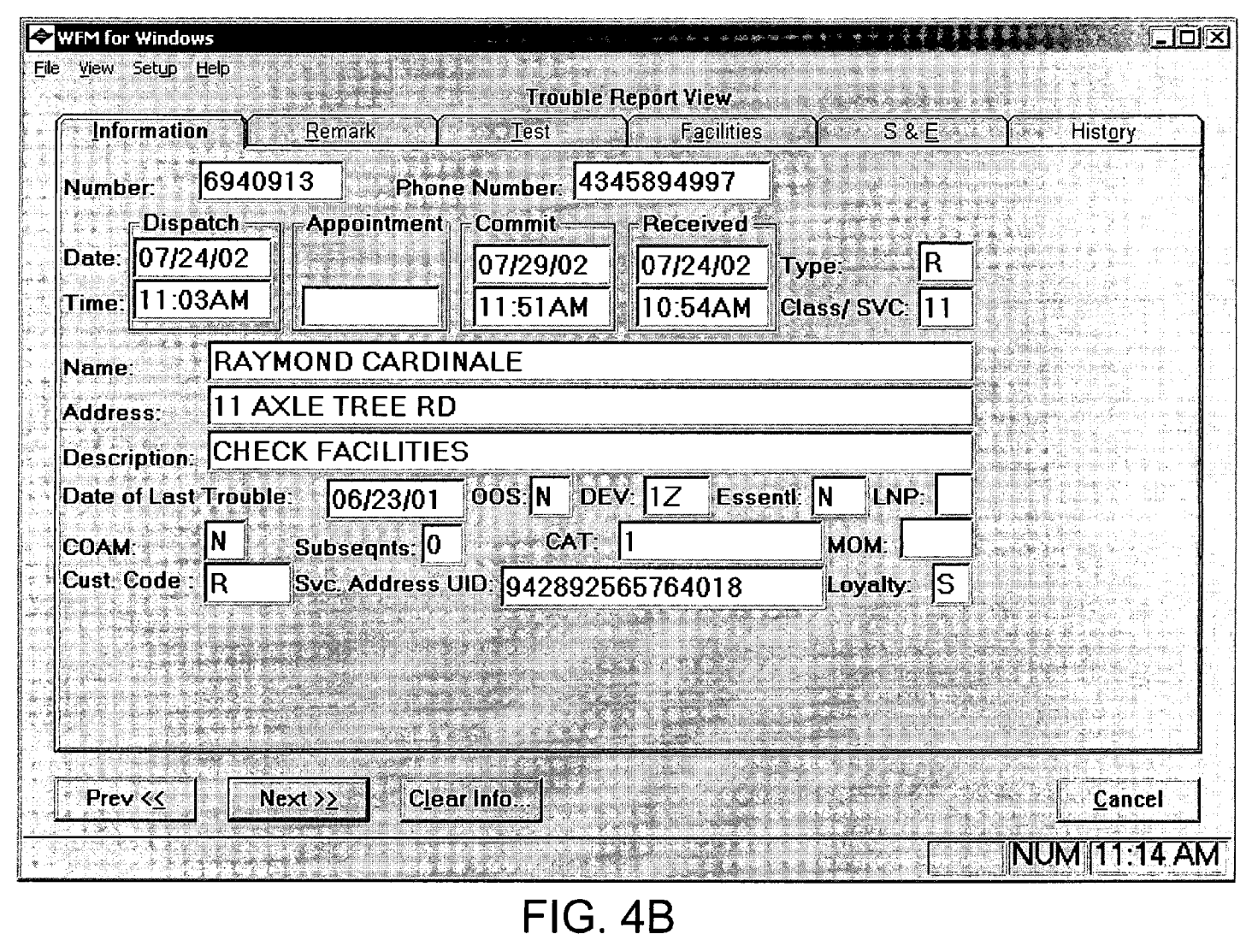

As illustrated in FIG. 4B, a variety of demographic data, such as a customer's contact information, a variety of test remarks and remark fields, facilities data, and a history of prior services rendered to the customer can be included. FIG. 4B also illustrates that various other data can be included and is contemplated within the scope of the present invention.

Figure 4C:
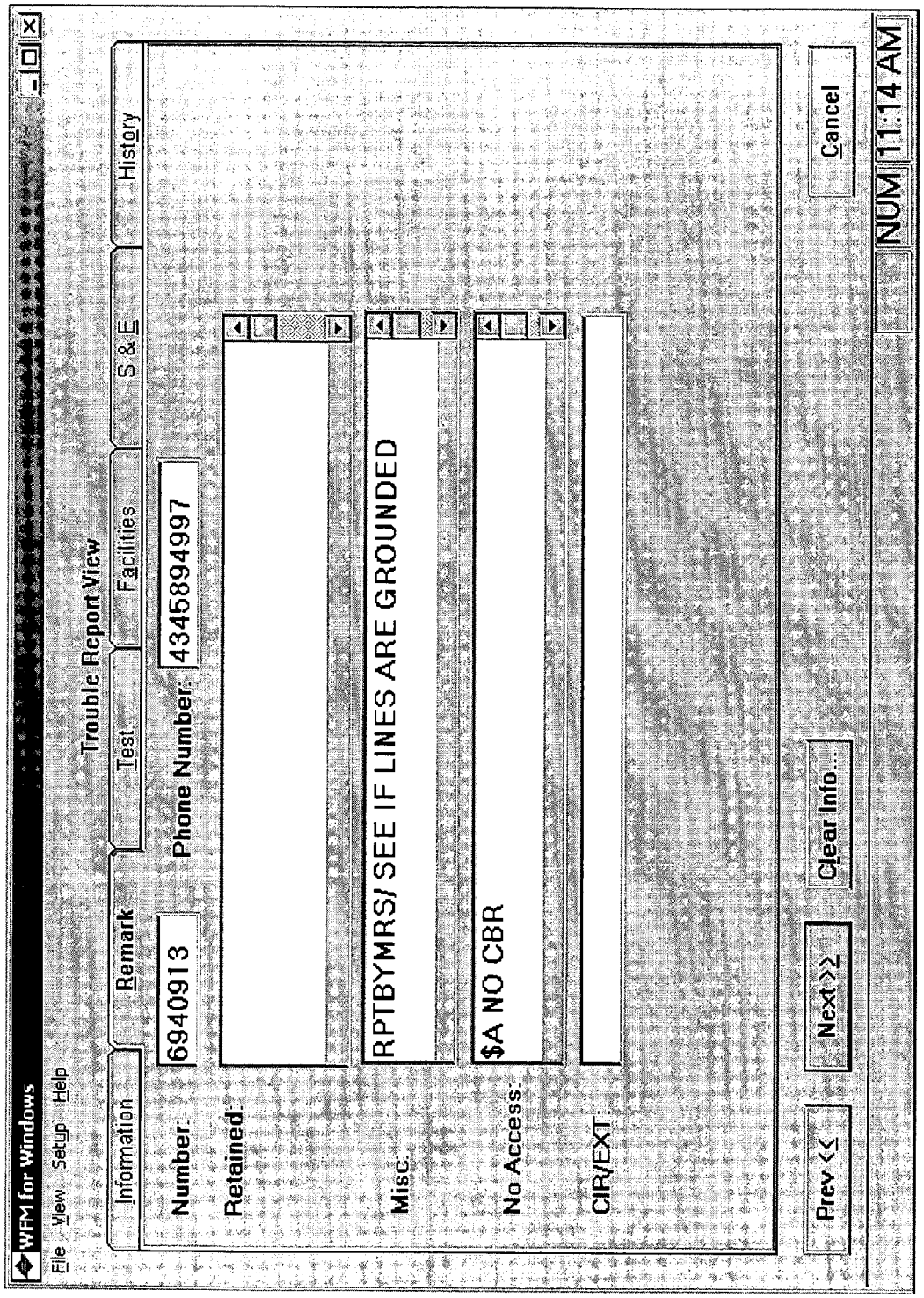
Figure 4D:
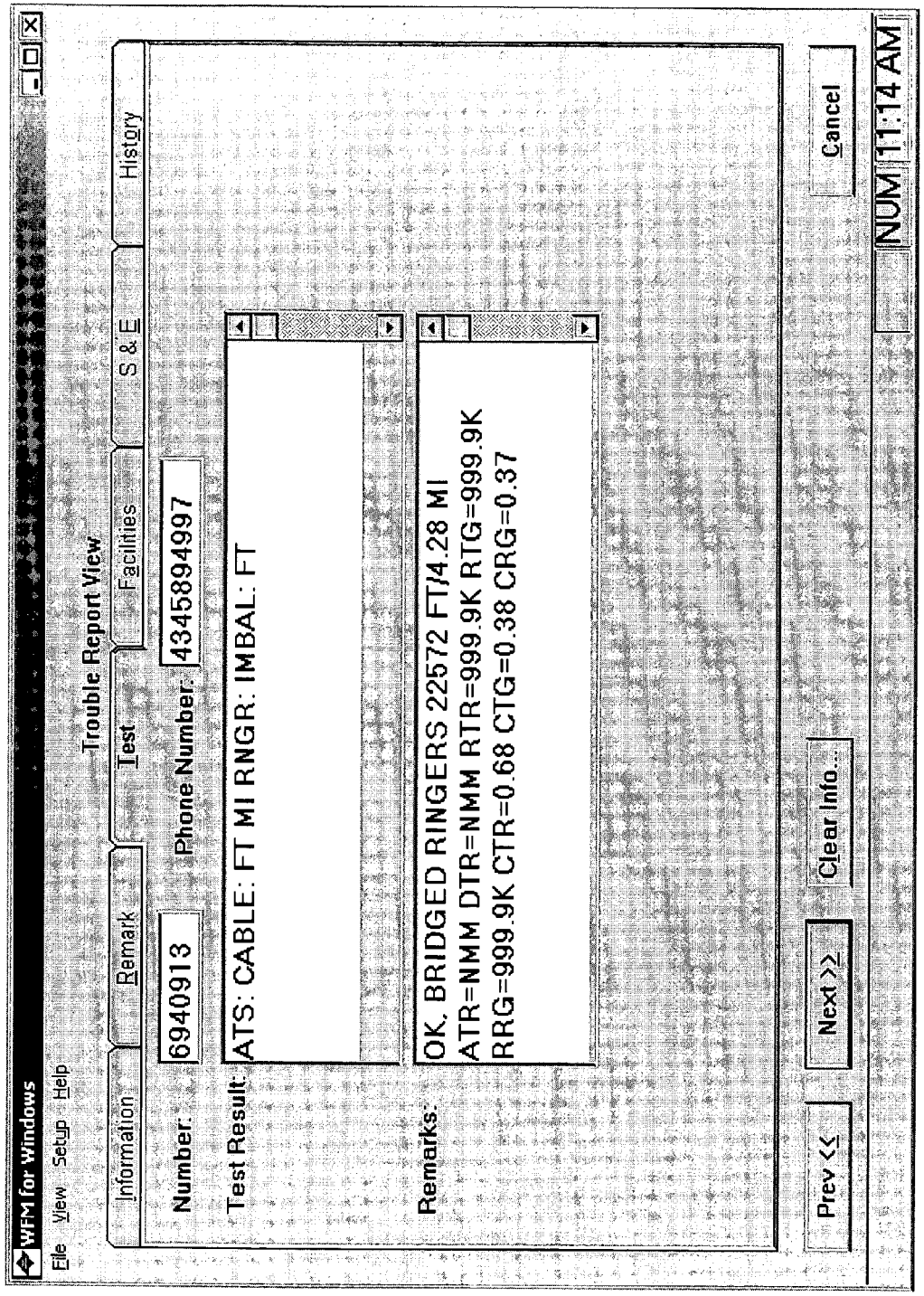
Figure 4E:
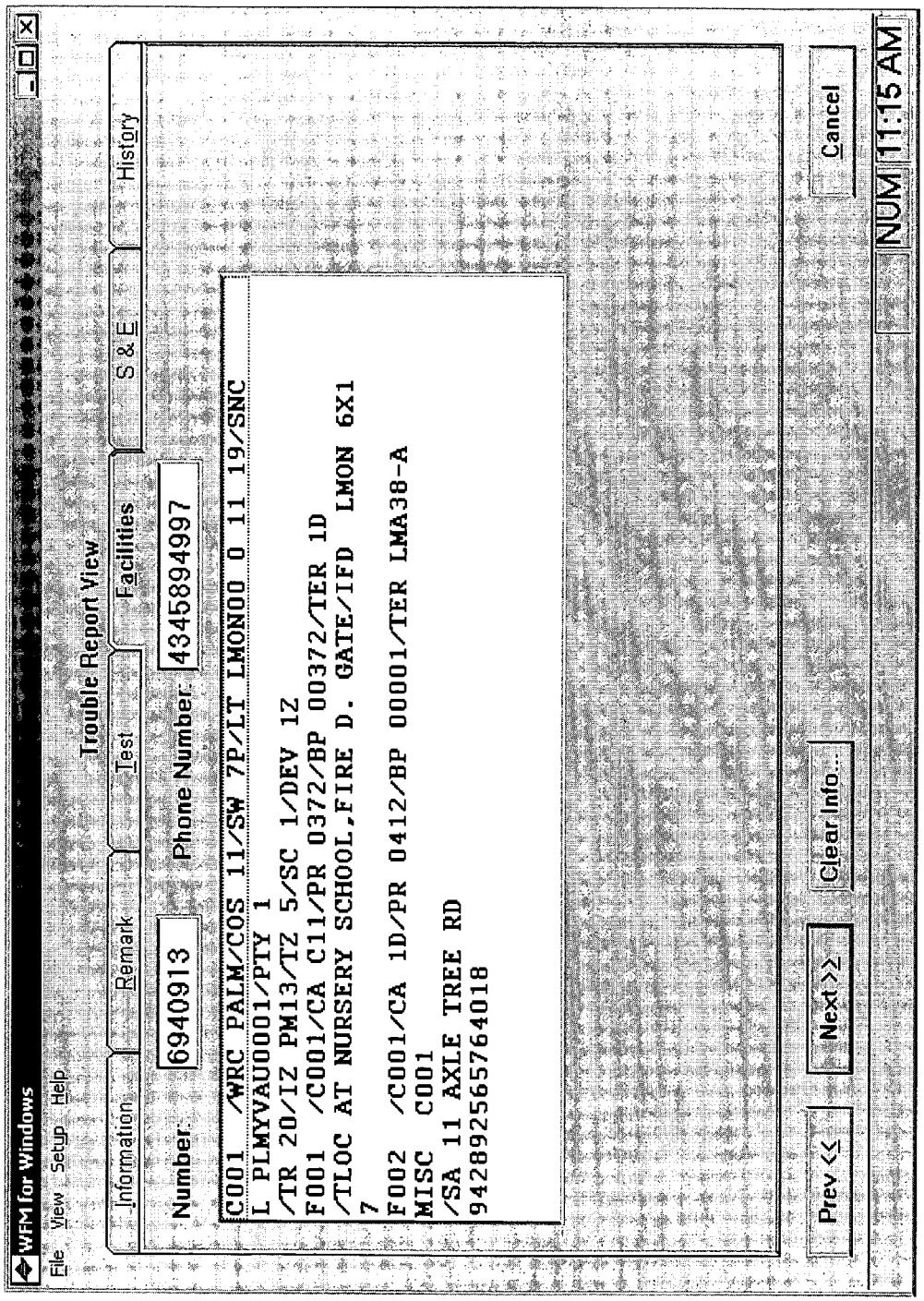
Figure 4F:
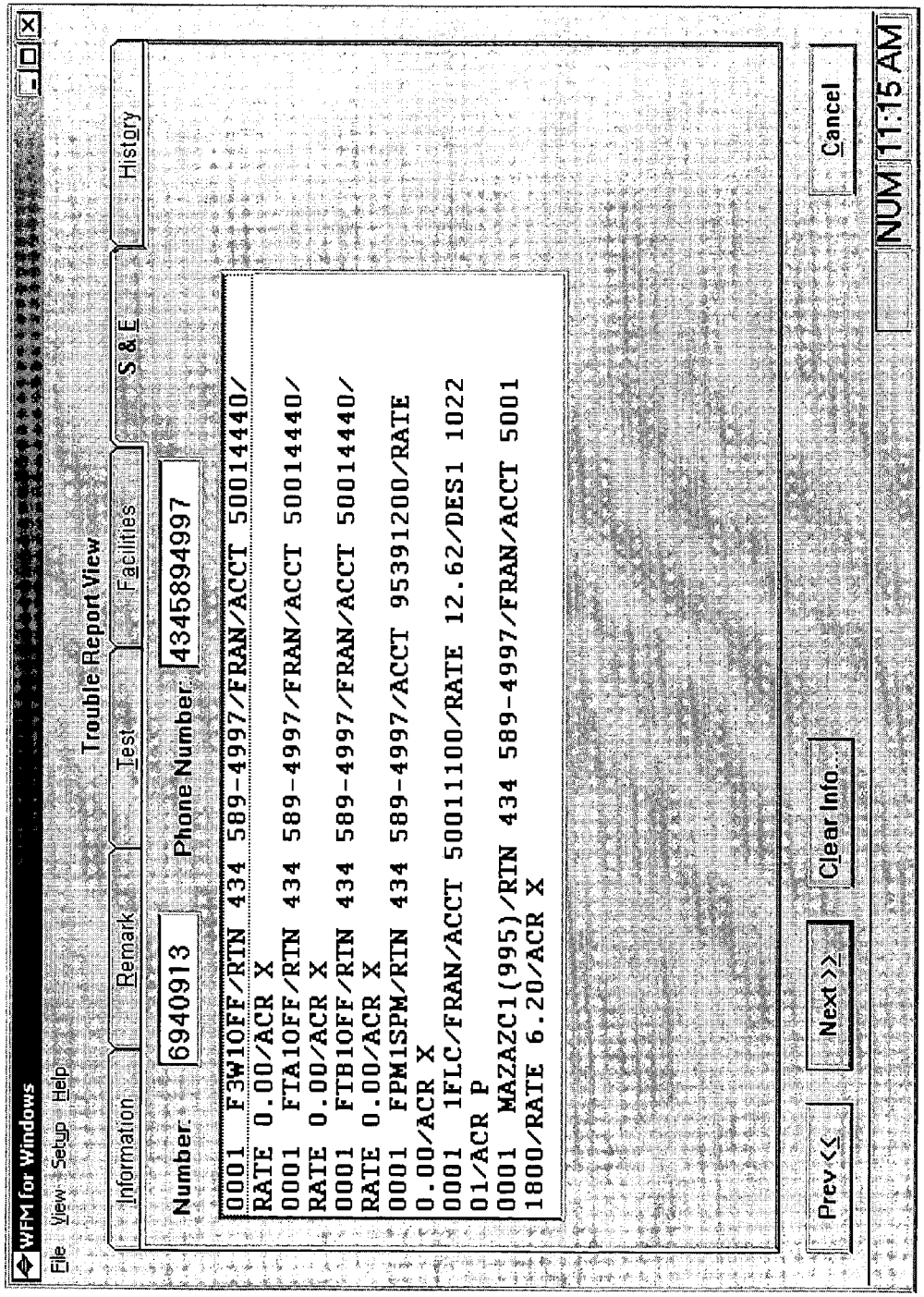

FIG. 4C is a screen shot of a "remarks screen" within the trouble-report-screen presentation. This screen allows the technician to either read or write various remarks associated with the job. FIG. 4D is a screen shot illustrating an area provided by the present invention to communicate test results and log additional remarks. FIG. 4E is a screen shot illustrating facilities data that can be rendered by the present invention. FIG. 4F illustrates the various sales and equipment associated with the job ticket. FIG. 4G is a screen shot illustrating how the history of the customer's problems can be communicated using the present invention.

Figure 4H:
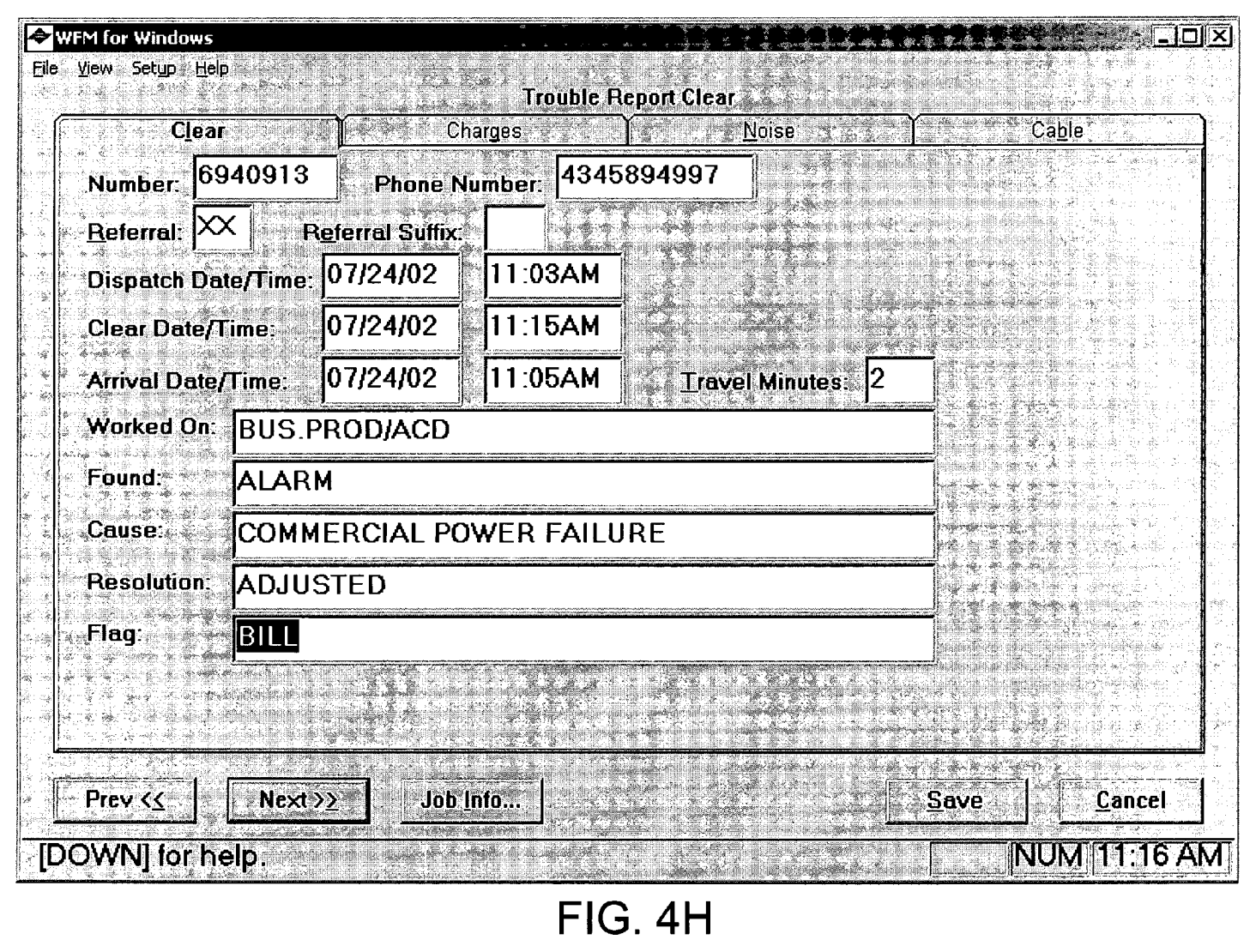
Figure 4I:
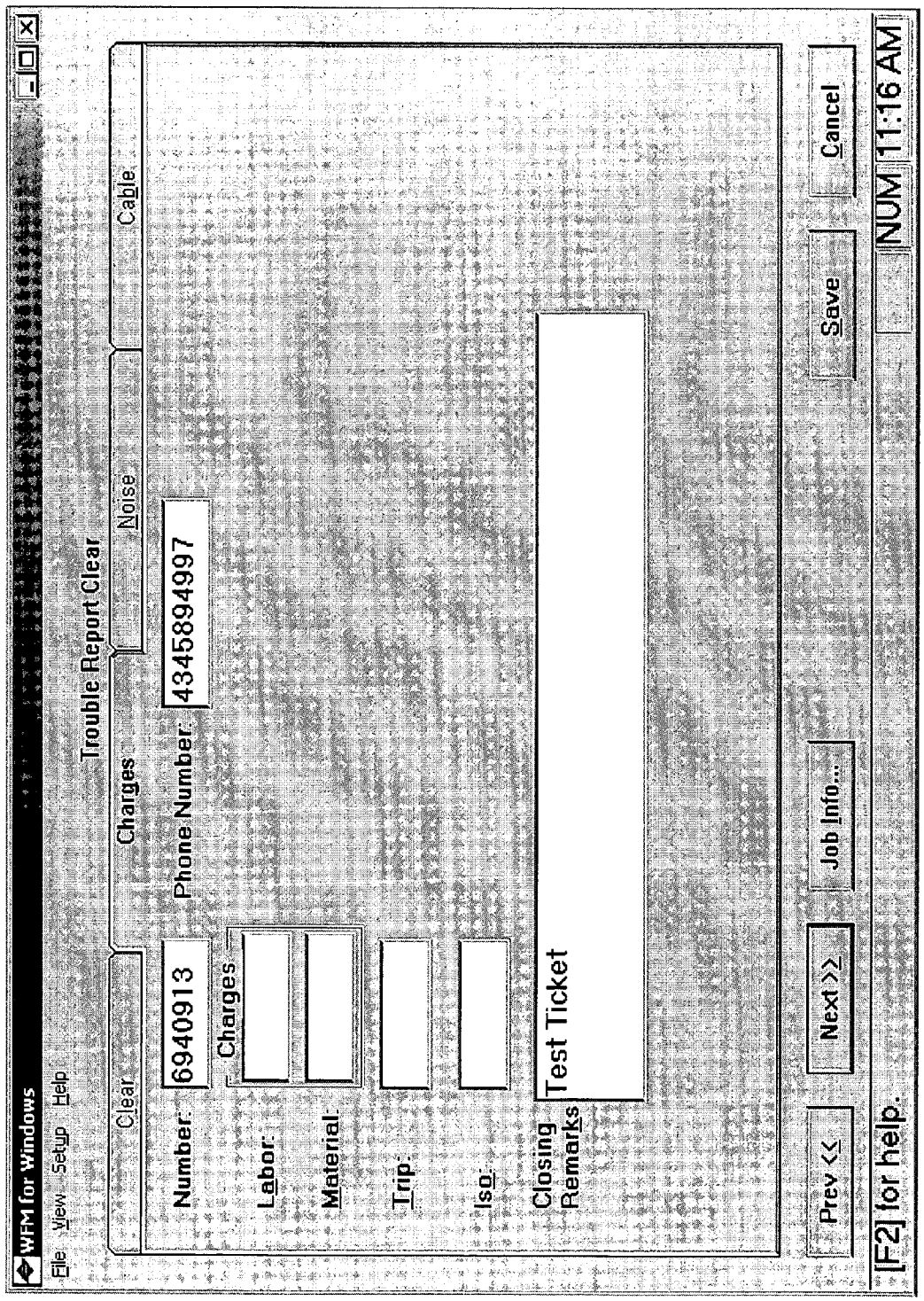
Figure 4J:
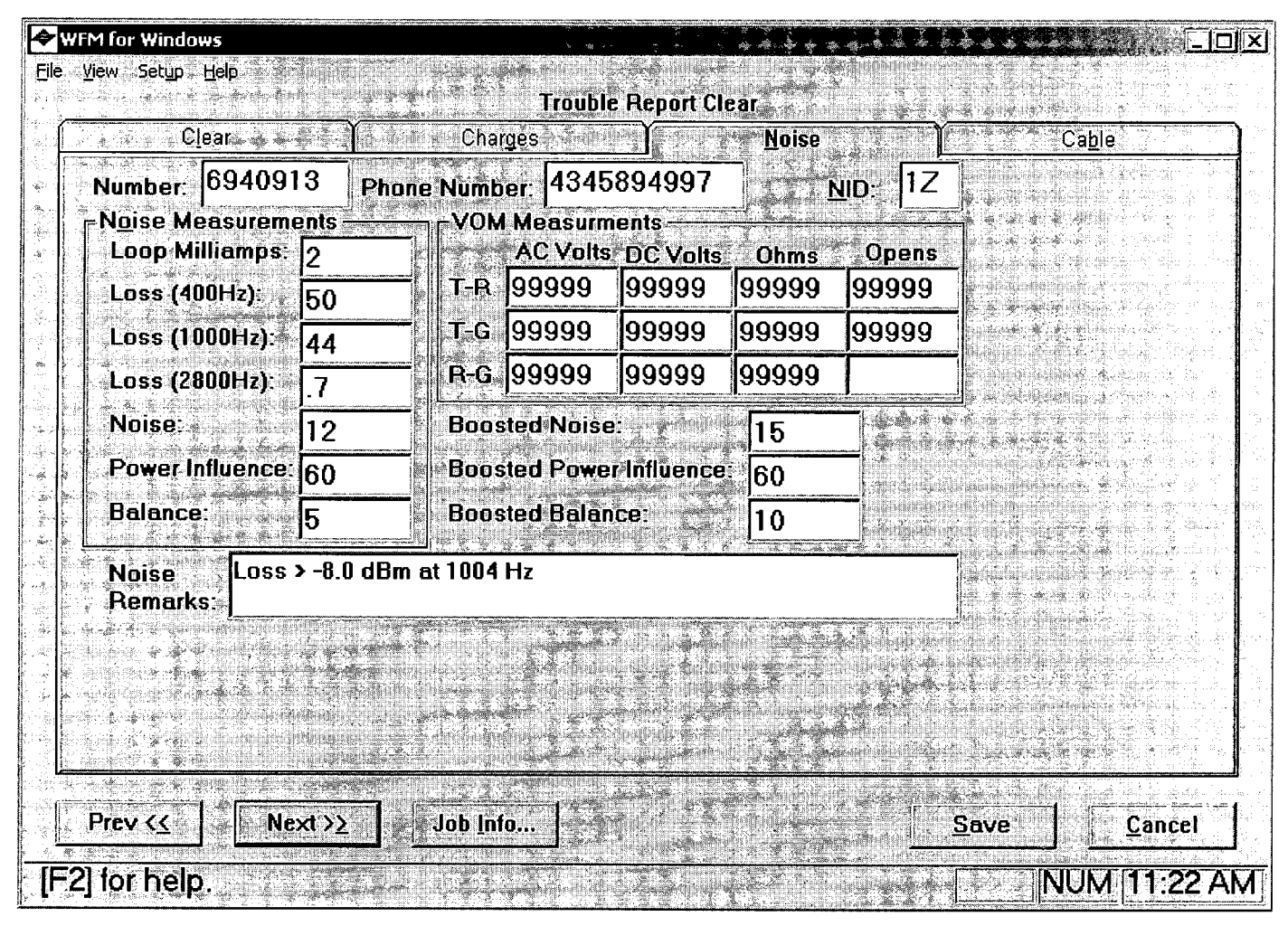
Figure 4K:
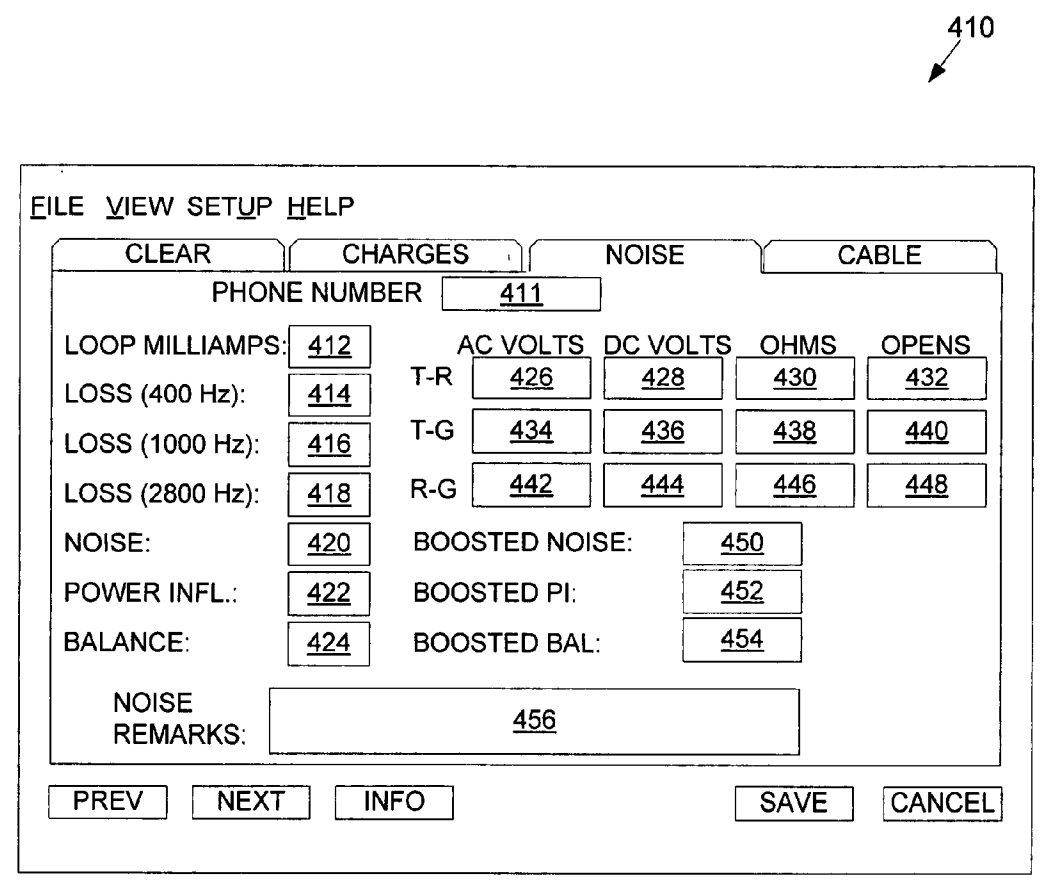

The report-resolution-screen presentation is provided with various screen shots and illustrations in FIGS. 4H through 4L. FIG. 4H illustrates a screen used by technician 140 to describe the different types of problems encountered and action steps taken. FIG. 4I depicts a screen used to log different billable costs including labor, trip costs, material costs, and remarks. FIG. 4J illustrates an exemplary test-results-presentation screen. FIG. 4K is a block-diagram representation of the screen shot of 4J, which is referenced generally by the numeral 410.

The test-results-presentation screen 410 includes a telephone number identifier 411 to indicate the telephone number associated with the line test. Various noise measurements are taken and displayed on the results view 410. For example, a loop-current measurement 412 is captured. Loss measurements performed at various frequencies such as 400 Hz 414, 1000 Hz 416, and 2800 Hz 418 are captured. A noise measurement 420 is captured along with a power-influence measurement 422 and a balance measurement 424.

Figure 4L:
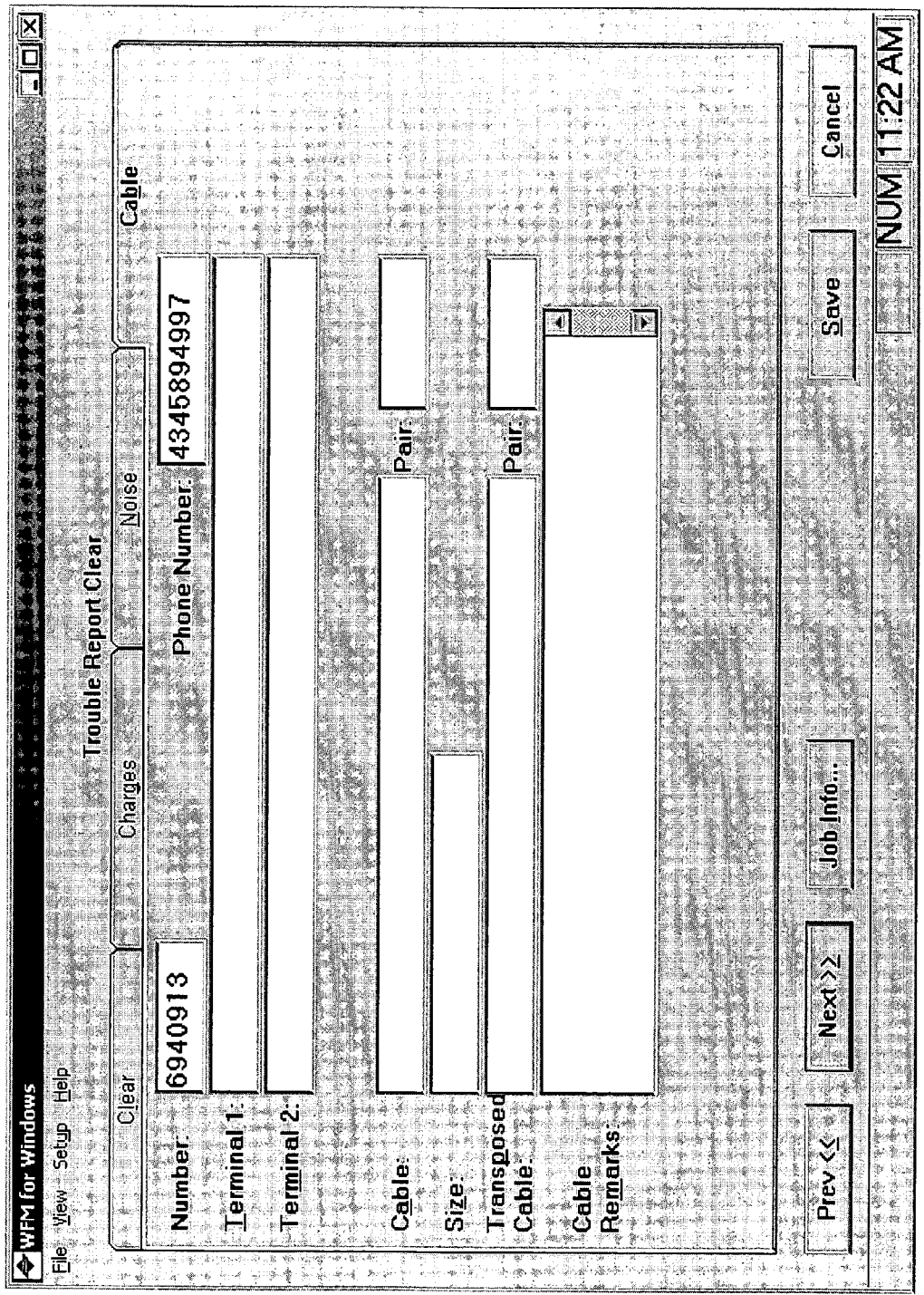
FIG. 4L is a cable-data screen shot.

At least three sets of tip, ring, and ground measurements are captured. First, at least the following tip-to-ring measurements are captured: an AC-voltage measurement 426, a DC-voltage measurement 428, a resistance measurement 430, and an "opens" measurement 432. Second, at least the following tip-to-ground measurements are captured: a second AC-measurement 434, a second DC-voltage measurement 436, a second resistance measurement 438, and a second "opens" measurement 440. Third, at least the following ring-to-ground measurements are captured: a third AC voltage measurement 442, a third DC voltage measurement 444, a third resistance measurement 446, and a third "opens" measurement 448. A boosted-noise measurement 450 is captured along with a boosted-power-influence measurement 452 and a boosted-balance measurement 454. Finally, a noise-remarks area 456 is also included. FIG. 4L is a screen shot that illustrates data related to cable 142 and is also provided by the present invention, including the cable's size and cable remarks.

As can be seen, the present invention, and any equivalent, is well adapted to provide a useful method for conducting a completion test on a communications line. Capturing test results and dynamically making those results available to remote viewers increases the quality of tests, permits forecasting of future problems, decreases the likelihood of callbacks, and enables historical analysis of past results. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments, which the present invention pertains without departing from its scope, will become apparent to those skilled in the art.

It will be understood that certain features and subcombinations are of utility and may be employed without reference to other features and subcombinations and are contemplated within the scope of the claims. Not all steps listed in the various figures need be carried out in the specific order described.

What the invention claimed is:

1. A method for providing line test results, the method comprising:
   receiving the line test results from a first client device;
   storing the test results;
   providing remote access to the test results;
   providing the test results to an evaluation application;
   performing close out tests by selecting from a group of operations:
      receiving additional data associated with rerun tests that produce results within the test parameters; and
      receiving an override indication; and
   evaluating the test results for accuracy.

2. The method of claim 1, wherein the first client device includes a selection from the group comprising: a client computer, a consumer electronic device, a handheld device, a handheld terminal, and a personal data assistant (PDA).

3. The method of claim 2, wherein the test results include results from a test selected from the group comprising: a voltage test, a current test, a resistance test, an impedance test, a reactance test, a line test, a tone test, a balance test, a frequency test, a loss test, a signal degradation test, a power-influence test, a noise test, a fault test, a dead-air test, a continuity test, a signal-quality test, a completion test, a loop-length test, a joint-resistance test, an irregular-load test, a capacitance test, a wet-cable test, and a split-pair test.

4. The method of claim 3, wherein receiving the test results includes:
   logically coupling the first client device to a test server; and
   receiving data captured by the first client device at the test server.

5. The method of claim 4, wherein storing the test results includes embodying the test results in a computer-readable medium.

6. The method of claim 5, wherein providing remote access to the test results includes providing access to the test results via a computer network.

7. The method of claim 6, wherein the computer network includes a selection from the group comprising: a single line, a wireless network, a local-area network (LAN), a wide-area network (WAN), a distributed network, a communications network, World Wide Web, and the Internet.

8. The method of claim 7, wherein providing remote access to the test results includes providing for the presentation of the test results.

9. The method of claim 8, wherein providing for the presentation of the test results includes providing for the presentation of the test results on a second client device.

10. The method of claim 9, wherein the second client device includes a selection from the group comprising: a computer, a display device, a consumer electronic device, a printer, a speaker, and a handheld device, including a personal data assistant (PDA), a mobile phone, a handheld terminal, the first client device, and any other electronic device adapted to present transmitted information to a user.

11. The method of claim 4, wherein storing the test results includes storing a location from where the test results were obtained.

12. The method of claim 11, wherein storing the test results further comprises:
   associating the test results with a technician who conducted the test; and
   integrating technician data with the test results.

13. The method of claim 12, wherein the technician data include a selection from the group comprising: a technician identifier, contact information, and prior test results obtained by the technician.

14. The method of claim 1, wherein the evaluation application receives test parameters from a remote service and determines which of the one or more line tests failed.

15. The method of claim 1, wherein receiving the override indication further comprises: requiring that comments be entered in remarks fields prior to closing the test, if the override indication is received.

16. A method for performing line tests on a communication line in a communication network, the method comprising:
   initiating one or more line tests on a communication line;
   receiving test data that includes a set of line results received in response to running mandatory tests;
   providing said test data to an evaluation application;
   communicating the test results to a remotely accessible storage medium;
   evaluating the test results for accuracy; and
   presenting the test results on at least one presentation screen selected from the group consisting of: a trouble report presentation screen, and a report resolution presentation screen.

17. The method of claim 16, wherein evaluating the test results for accuracy further comprises: performing subsequent action to correct unresolved problems.

18. The method of claim 16, wherein the evaluation application receives test parameters from a remote service and determines which of the one or more line tests failed.

19. The method of claim 16, wherein the test data includes data from a test selected from the group comprising: a voltage test, a current test, a resistance test, an impedance test, a reactance test, a line test, a tone test, a balance test, a frequency test, a loss test, a signal-degradation test, a power-influence test, a noise test, a fault test, a dead-air test, a continuity test, a signal-quality test, a completion test, a loop-length test, a joint-resistance test, an irregular-load test, a capacitance test, a wet-cable test, and a split-pair test.

20. The method of claim 16, wherein the evaluation application runs on a portable device, and where the portable device includes a selection from the group comprising a computer, a consumer electronic device, a handheld device, a handheld terminal, a personal data assistant (PDA), a display device, and a mobile phone.

21. The method of claim 16, further comprises: storing the test data such that they are accessible by a presenting application that presents at least a portion of the test data on a user interface.

22. The method of claim 16, wherein the user interface includes a network browser, wherein the network browser includes an Internet browser.

23. A handheld device programmed to execute the machine-useable instructions of claim 16.

24. The method of claim 16, wherein the trouble report presentation screen communicates test data that includes demographic data related to a communications line user.

25. The method of claim 16, wherein the report resolution presentation screen communicates test data that includes information related to the different problem-resolution steps taken by a communication line technician.

* * * * *